United States Patent

Rands

(10) Patent No.: US 7,363,567 B2
(45) Date of Patent: Apr. 22, 2008

(54) SYSTEM AND METHOD FOR ELECTRONIC DEVICE TESTING USING RANDOM PARAMETER LOOPING

(75) Inventor: Robert A. Rands, Spokane, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 690 days.

(21) Appl. No.: 10/650,957

(22) Filed: Aug. 28, 2003

(65) Prior Publication Data

US 2005/0048925 A1    Mar. 3, 2005

(51) Int. Cl.
*G01R 31/3183* (2006.01)
*G01R 31/40* (2006.01)

(52) U.S. Cl. .................. 714/739; 714/735
(58) Field of Classification Search .......... 714/739, 714/30, 738; 708/254, 255; 713/176
See application file for complete search history.

(56) References Cited

U.S. PATENT DOCUMENTS

| | | | | |
|---|---|---|---|---|
| 3,819,878 A * | 6/1974 | Pine et al. | ............ | 379/27.01 |
| 5,383,143 A * | 1/1995 | Crouch et al. | ............ | 708/254 |
| 5,893,031 A * | 4/1999 | Hoogerwerf et al. | ....... | 455/410 |
| 6,961,871 B2 * | 11/2005 | Danialy et al. | ............ | 714/30 |
| 7,007,166 B1 * | 2/2006 | Moskowitz et al. | ......... | 713/176 |

* cited by examiner

*Primary Examiner*—Cynthia Britt
*Assistant Examiner*—Dipakkumar Gandhi

(57) ABSTRACT

Disclosed is a system and method for testing electronic devices which uses a random pattern for testing electronic devices. In one embodiment there is communicated to a device under test (DUT) a test sequence causing the DUT to exercise certain parameters in a controlled pattern of operation. The test sequence is randomly created. In one embodiment this random creation is controlled by a random looping algorithm which controls both the order of and the magnitude of each parameter. Included, if desired, is the ability to selectively retransmit previously communicated test sequences.

7 Claims, 4 Drawing Sheets

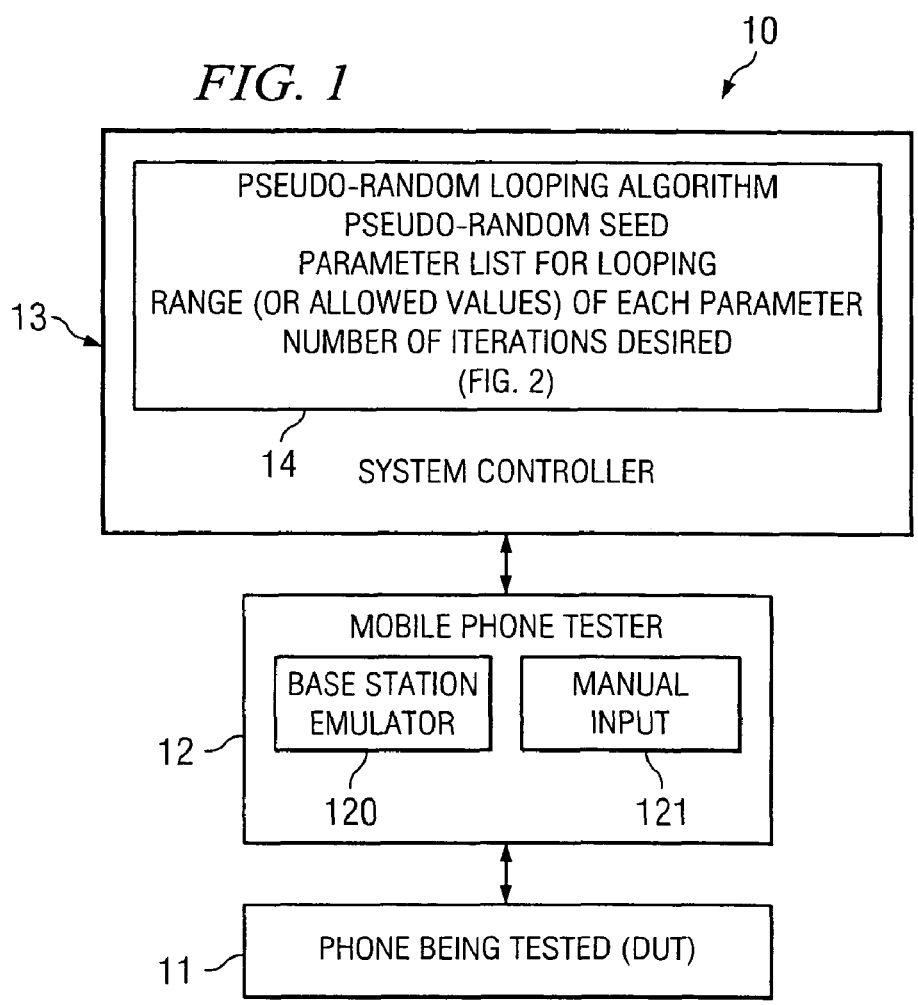

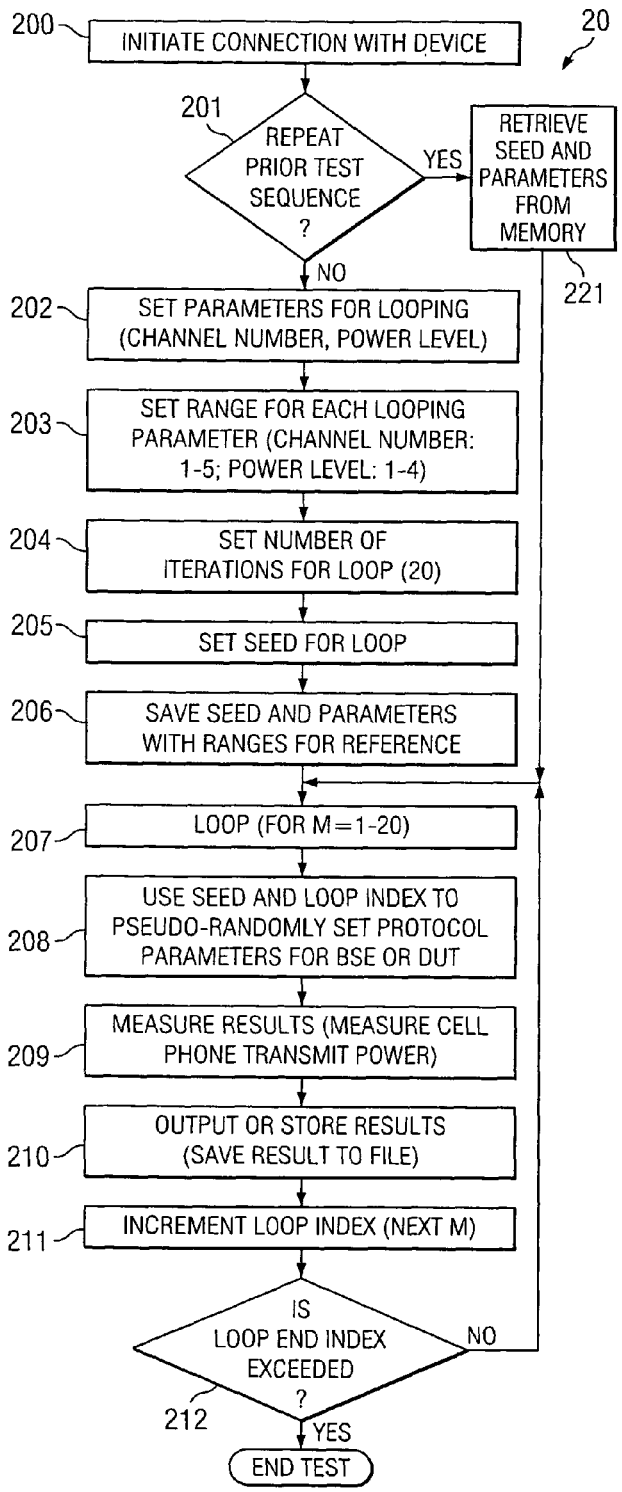

FIG. 2C

PSEUDO-RANDOM LOOP (POSSIBLE PATTERN 2)

| STEP NUMBER | CHANNEL NUMBER | POWER LEVEL |
|---|---|---|
| 1 | 1 | 2 |
| 2 | 3 | 3 |
| 3 | 2 | 3 |
| 4 | 5 | 1 |
| 5 | 4 | 2 |
| 6 | 1 | 1 |
| 7 | 2 | 4 |
| 8 | 5 | 3 |
| 9 | 4 | 1 |
| 10 | 2 | 3 |
| 11 | 3 | 2 |
| 12 | 3 | 4 |
| 13 | 2 | 1 |
| 14 | 5 | 2 |
| 15 | 3 | 4 |
| 16 | 4 | 3 |
| 17 | 1 | 1 |
| 18 | 5 | 1 |
| 19 | 2 | 4 |
| 20 | 2 | 2 |

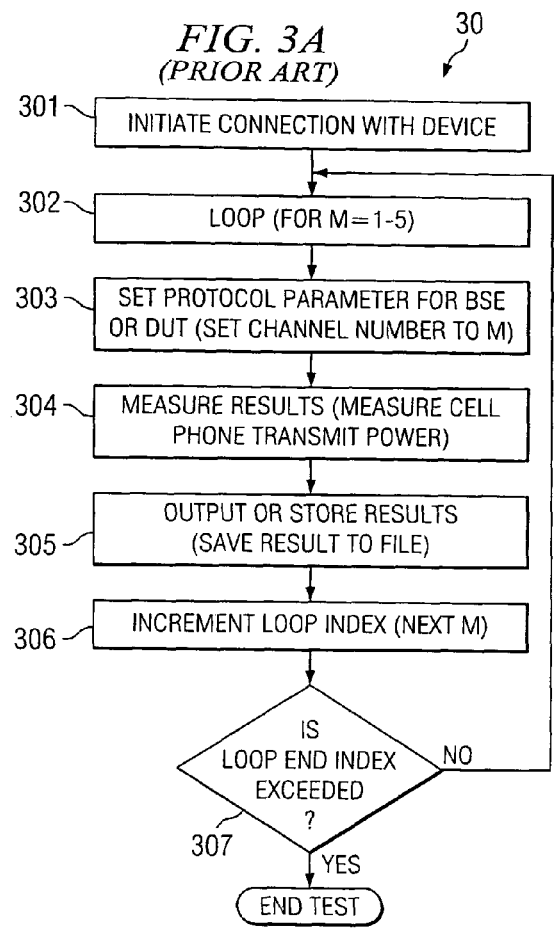

FIG. 3A (PRIOR ART)

- 301: INITIATE CONNECTION WITH DEVICE
- 302: LOOP (FOR M=1-5)
- 303: SET PROTOCOL PARAMETER FOR BSE OR DUT (SET CHANNEL NUMBER TO M)
- 304: MEASURE RESULTS (MEASURE CELL PHONE TRANSMIT POWER)
- 305: OUTPUT OR STORE RESULTS (SAVE RESULT TO FILE)
- 306: INCREMENT LOOP INDEX (NEXT M)
- 307: IS LOOP END INDEX EXCEEDED? NO → loop back; YES → END TEST

FIG. 3B (PRIOR ART)

SIMPLE LOOP

| STEP NUMBER | CHANNEL NUMBER |
|---|---|
| 1 | 1 |
| 2 | 2 |
| 3 | 3 |
| 4 | 4 |
| 5 | 5 |

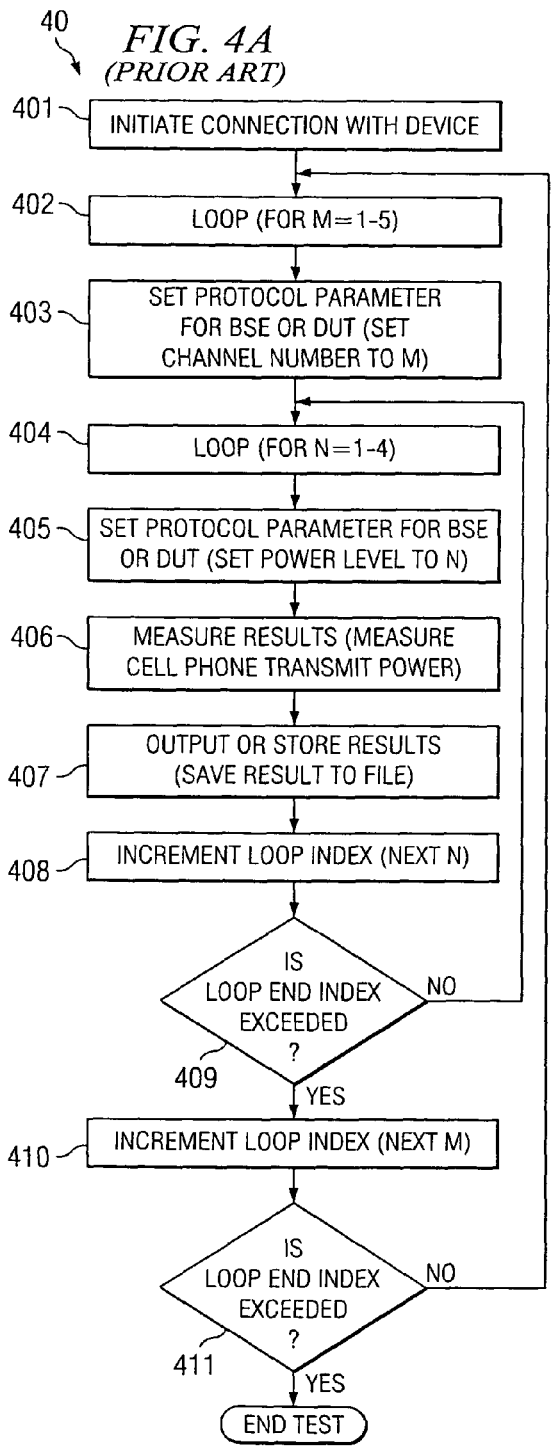

SYSTEM AND METHOD FOR ELECTRONIC DEVICE TESTING USING RANDOM PARAMETER LOOPING

TECHNICAL FIELD

This invention relates to testing systems and more particularly to systems and methods for testing complex electronic equipment, such as cell phones, in laboratory situations to insure reliability under actual conditions.

BACKGROUND OF THE INVENTION

Complex electronic equipment often must operate under a myriad of circumstances and conditions and must perform properly regardless of the environment and regardless of the sequence of operations performed.

Wireless devices, such as cell phones, are one example of a device which must operate under a large variety of conditions in complex environments which are often changing. For this reason devices are laboratory tested to precise scripts which seek to anticipate the various environmental conditions and protocols to which the device will be subjected. However, tests performed in the laboratory, even according to the most rigorous test scripts, often do not test every possible permutation of the actual operating environment. This is so because the number of variable parameters is extremely large and often are dependant upon relative timing between operations or the relative enabling of different protocols in a certain pattern.

Testing, regardless of how imperfect the results, is critically important in the device design stage so that potential problems are discovered and their causes corrected before the design is complete.

One alternative to laboratory script-based testing is to actually take a prototype into the field and test it under various actual operating conditions. Even in such a situation it is unlikely that in any finite period of time the device under test will experience the range of conditions that it will eventually be subjected to during its effective lifecycle.

BRIEF SUMMARY OF THE INVENTION

Disclosed is a system and method for testing electronic devices which uses a random pattern for testing electronic devices. In one embodiment there is communicated to a device under test (DUT) a test sequence causing the DUT to exercise certain parameters in a controlled pattern of operation. The test sequence is randomly created. In one embodiment this random creation is controlled by a pseudo-random looping algorithm which controls both the order of and the magnitude of each parameter. The pseudo-random set protocol is established by a seed value which allows for repeatable test sequences.

BRIEF DESCRIPTION OF THE DRAWINGS

For a more complete understanding of the present invention, reference is now made to the following descriptions taken in conjunction with the accompanying drawing, in which:

FIG. 1 shows one embodiment of a testing system;

FIG. 2A shows one embodiment of the operation of a testing system;

FIGS. 2B and 2C show examples of testing parameters using the operation of FIG. 2A; and FIGS. 3A, 3B, 4A, 4B illustrate examples of prior art testing systems.

DETAILED DESCRIPTION OF THE INVENTION

Before describing the detailed operation of one embodiment, it may be best to address how the prior art utilizes precise and rigorous test scripts in a laboratory environment to anticipate the various conditions complex electronic device may face in actual use.

FIG. 3A shows one example of the prior art where simple loop script 30 is used to test only one particular set of parameters. Script 30 begins by process 301 which initiates a connection with the device under test (DUT). The number of iterations for which the test is to be run is set in process 302.

Within each iteration, or loop, process 303 sets the value of the specified protocol parameter to the value associated with the loop's index. This single protocol parameter may be associated with the DUT, or with the simulated base station emulator (BSE). Once the parameter is set, the results are measured at process 304 and then outputted or stored to be used in a later analysis, for example, by process 305. The loop's index is then incremented in process 306, and the system determines whether the script has finished its specified iterations in process 307. Based on such a determination, the script either ceases or continues via process 302 with the next iteration, setting the value of the associated protocol parameter to the value associated with the incremented index.

For example, FIG. 3B utilizing the simple loop script illustrated in FIG. 3A, depicts the values associated with the specified protocol parameter. The system first initiates contact as discussed in process 301, and then steps through the number of iterations, M, from 1 to 5. The system then determines what protocol parameter it is to be manipulated. In this example, FIGS. 3A and 3B have set the parameter to the channel number. The value of the channel number is then initialized to the value of M, in this case 1. After measuring the cell phone's transmit power at channel 1, the system then outputs or stores the results and increments the index to 2. The loop then continues, incrementing the channel number to 2 and measuring the results. Eventually, the index is incremented from 5 to 6, and the system determines whether the loop end index is exceeded. Since the loop index has been exceeded, the test is now finished. The test results based on the channel number will then be analyzed for problems encountered during laboratory testing.

Obviously, an algorithm for testing devices based on the simple loop script 30 is limited in that the designer/engineer can only test the functionality of a device in relation to a single protocol parameter. To test every possible parameter, the script must be run linearly, on the order of the total number of parameters and consuming valuable time and resources. Additionally, such an algorithm is incapable of testing the interaction between multiple protocol parameters at various ranges.

In recognition of this limitation, the prior art has expanded to include test scripts which utilize multiple loops to test the interaction between various protocol parameters. FIG. 4A exemplifies an algorithm based on multiple loop test script 40. After initiating a connection with the device to be tested at process 401, the outer loop index M is initialized in process 402 and set in process 403 to a specific parameter.

The system then initializes the index of an inner loop N, via process 404, and associates a second parameter with that index in process 405.

The result of the interaction and combination of the two parameters is then measured at process 406. The result is then either outputted or stored in process 407, and the inner loop's end index is incremented in process 408. The system then determines whether the index of the inner loop is exceeded via process 409. If the index is not exceeded, the inner loop returns and continues its iteration in process 404, incrementing the value of the associated protocol parameter to that of the incremented index.

Once the inner loop's iterations are complete, the system determines that the inner loop's index has been exceeded and exits the inner loop. The index of the outer loop is then incremented 4 in process 10, and the system determines whether the outer end index has been exceeded in process 411. If the outer end index has not been exceeded, the outer loop continues its next iteration, setting the value of the associated protocol parameter to that of the incremented index in process 403. The system then reinitializes the index of the inner loop; the outer loop's parameter remains fixed as the inner loop's parameter is increased with each iteration of the inner loop. The result from each iteration is again outputted or stored in process 407. Once the outer loop's end index has been exceeded in process 411, the test ends and the results are analyzed for issues arising with the different permutations.

FIG. 4B, utilizing the multiple loop script illustrated in FIG. 4A, depicts indexing the outer loop M (channel number in this example) in a range from 1 to 5. The system then determines and associates a specific protocol parameter with the outer index, selecting the channel number and setting its initial value to that of M. In the example, the system then determines the number of iterations the inner loop (power level in this example) is to traverse. In this instance, N is set to iterate four times. Through each iteration of the inner loop, the script tests the functionality of the first channel with power levels 1 through 4. After each iteration of the inner loop, i.e. channel number set to 1 and power level set to 1, the system outputs the results, increments the index of the inner loop, and then repeats the measurement. The channel number remains at 1, while the power level is incremented to 2, 3, and 4, respectively. (Thus, each channel will be tested four times, each time using a different power level.) Once the power level is incremented beyond 4, the inner loop ceases its iterations. The system then increments the index of the outer loop, M, and the channel number is changed to 2 (two). Upon re-entering the inner loop, the script then tests the combination of channel number 2 with each power level. The process continues until the outer index is incremented to 5. The script then exits and the test ceases.

While script 40 (FIG. 4A) is an improvement over simple loop script 30 (FIG. 3A), the use of such a multiple loop algorithm still presents a number of problems for designers. While the script may be written to include multiple inner loops, given the number of possible protocol parameters, testing every possible permutation is time consuming and infeasible. Moreover, since the sequence of testing is well-defined, it does not correlate well with real-world conditions. For example, in an everyday setting, a user will normally not encounter a device that sequentially iterates through the various ranges of each parameter. Instead, the device will transition between various parameter values based on various conditions which are not simulated. As such, the multiple loop algorithm continues to limit the ability of a designer to effectively simulate real-world conditions and address the issues a user will face under real-world conditions. And while field testing remains a valuable alternative available to designers/engineers, providing them with real-world transitions, field testing is expensive. Additionally, it is often difficult or impossible to reproduce the exact situation in a protocol process that caused the failure. It then becomes exceedingly difficult to diagnose problems encountered in field testing in order to remedy the design problem. As such, the desire and need exists for a testing protocol that enables the designer of complex electronic equipment in a laboratory setting to randomly test different permutations of the protocol parameters that affect complex electronic equipment in an effort to simulate and address the real-world use of such devices.

Turning now to FIG. 1, there is shown one embodiment detailing system and method 10 utilizes pseudo-random loop algorithm 14. Such an algorithm can be embedded in system controller 13 (or in mobile phone tester 12) which in turn, sends the parameters, permutations, and values for each parameter to be tested to mobile phone tester 12. Controller 13 receives the results of the test from mobile phone tester 12 for further processing and for presentation to a user of system 10. Mobile phone tester 12 itself contains base station emulator (BSE) 120 and is in direct communication with DUT 11. Controller 13 can be a PC or a specialized test set, if desired, and could contain memory as well as processing capability. A graphical user interface could be provided for presentation of the data to the user.

As noted above, system 10 contains pseudo-random loop algorithm 14 that is responsible for randomly testing available permutations of protocol parameters. FIG. 2A details one embodiment 20 of such an algorithm. Pseudo-random loop algorithm 20 comprises, for example, pseudo-random seed 205, parameter list for looping 202, range, or the allowed values of each parameter 203, and the number of iterations desired 204. Any number of other parameters can be established as desired. If desired, a fully random algorithm could be used, but by using the seed to establish pseudo-randomness it is easier to achieve test repeatability.

As shown in FIG. 2A, process 200 of algorithm 20 first initiates a connection with the DUT. If this is to be a repeat test, process 201 directs the retrieval from memory of the seed, and the parameters of the prior test via process 221. If this is a new test then the system, via process 202, sets the protocol parameters which are associated both with the BSE and DUT. Under such an algorithm, the number of parameters is neither limited by the amount of time it will take to iterate through each possible permutation nor by the number of iterations. The range for each protocol parameter is then determined in process 203, and the system sets the number of iterations for the loop in process 204. Another embodiment of such a system may have the system prompt the designer/engineer for the protocol parameters to be tested, the range for each parameter, and the number of iterations via manual input 121 (FIG. 1). Embodiments may utilize a combination of user input and system determination in setting each of these values.

Once the number of iterations has been determined, the algorithm then sets the seed for the pseudo-random generator in the loop. The seed could be determined by the code designer from a random number generator, or the user (or system) could use any number, for example, the time since midnight in milliseconds.

The seed for pseudo-random generation is then retained for reference in process 206, and the first iteration of the loop begins in process 207. Utilizing the pseudo-random seed and loop index, process 205 pseudo-randomly sets the value of each protocol parameter in process 208. In the example being illustrated, the algorithm would set values for parameters associated with both the DUT and, if desired, the BSE, with no limitation on the number of parameters that may be included in the testing. Once the specified parameters have been set, the results are then measured via process 209 and then either outputted or stored via process 210. It is important to note that, though the algorithm is embodied within system controller 13, the results from the test will first be recorded by mobile phone tester 12. Tester 12 may then either retain the results until all iterations of the loop are complete or may immediately send the results back to system controller 13. This communication can be either by wireline or wireless. Using a stack based BSE allows protocol parameters such as channel number, channel type, or power level to be changed in any order because it handles all the protocol messages for making the transition between states in the BSE and DUT. Using the seed and loop index number in the system controller to pseudo-randomly set protocol parameters allows for great variation in the order protocol parameters are sequenced.

Once the result has been preserved, the loop end index is incremented via process 211, and the algorithm determines whether the loop has exceeded its end index, process 212. If the end index has not been exceeded, the loop continues with its next iteration. Once the loop's end index is exceeded, the test ends and, depending on the specific embodiment, the results from the final test, which have been recorded by mobile phone tester 12, may immediately be sent back to system controller 13. Alternatively, mobile phone tester 12 may return the results from all permutations to system controller 13.

FIGS. 2B and 2C are examples of possible permutations that may result from the utilization of pseudo-random loop algorithm 20. After initiating a connection with the DUT, the system or the designer/engineer, or a combination thereof, selects the channel number and power level (and any other parameters desired) as the protocol parameters in the test. Note that in this context the magnitude can be either the level (such as power level, channel number, etc.) or could be a value (such as PCS band). The system or designer/engineer then instructs the system to iterate, for example, 20 times and the pseudo-random seed is generated and retained for future use. The loop index, M, is initialized to 1 and the pseudo-randomly generated seed is used to set the values of the channel number and power level. Note that in FIG. 2B in step 1, the system is testing channel 4 at a power level of 2, while at step 2, channel 2 is being tested at a power level of 1. The system then measures the DUT's transmit power with such a permutation, and outputs or stores the result. The value M is then incremented. Since the end index has not been exceeded, the system repeats the test with different values, generated by the pseudo-random seed, for each parameter. This process continues until the loop end index is exceeded, thereby ending the test.

As noted above, the results from each iteration may have been stored locally in tester 12 or may have been immediately transmitted back to system controller 13. In either case, all results are transmitted back to system controller 13 to be preserved for display and/or analysis. Note also that the next time a test is run (as shown in FIG. 2C) a new seed is created and this relationship between the channel number and power level (or other parameters being tested) is different, as is the order of channel testing. Thus, random testing patterns are achieved even with the same loop index parameters. Note also that the sequence shown in FIGS. 2B and 2C are examples for illustration purposes only since the actual testing would be random. Also the parameters (such as channel and power are likewise only used as examples) unlike the permutations discussed with respect to FIGS. 3B and 4B of the prior art.

In a specific embodiment, system controller 13 (FIG. 1) may contain: memory containing the pseudo-random loop algorithm; a record of each transition between the randomly-generated protocol parameters and the results from each different test; and the controller could be used for evaluating all the results from a given test sequence; and could also be used to store and analyze all the protocol messages that passed between the Base Station Emulator (BSE) and DUT for proper operation or errors. Having a stack-based BSE in the Mobile Phone Tester handles all of the messages required for transition from one protocol state to another, such as during a channel change. It also allows the Mobile Phone Tester to respond to messages from the DUT algorithmically in a way similar to real networks and thus eliminates the need for predetermined protocol states.

As shown in FIG. 2A, if a particular test sequence is to be repeated, process 221, either under system control or under control of the user, would set the seed and parameters to those of the test sequence to be repeated. Because the seed and parameters of the sequence are the same as those for the original sequence the looping algorithms would result in the original sequence of protocol state changes and tests would be exactly repeated. This pattern could also be applied to the same DUT or more devices as desired.

In communication with system controller 13, mobile phone tester 12 is responsible for initiating the connection with the electronic device being tested. For example, in FIG. 1, mobile phone tester 12 maintains a connection with a DUT. A connection may be initiated between mobile phone tester 12 and DUT 11 in a number of different ways.

In one embodiment, the tester may be a base into which the cell phone is plugged. The tester then has a direct, hard-wired connection to the device and may manipulate the DUT's protocol parameters through electronic circuitry. In another embodiment, the tester may be wirelessly connected to the DUT and this may emulate a base station or centralized server which communicates with the DUT via wireless networks.

Advantages of utilizing a pseudo-random loop system and method over the prior art are numerous. A pseudo-random algorithm more closely mimics the real networks for which the electronic device under test was designed. Under real network conditions, the protocol processes are exceedingly random. Depending on environmental and device conditions, the BSE's and DUT's parameters may randomly alter the values of a number of different parameters in an effort to provide maximum functionality of the device. Such randomly-generated variations, such as variations in weather conditions, battery power, location of user or other users, etc., can affect an electronic device in ways unable to be simulated under tests using the prior art. By utilizing the seed to pseudo-randomly generate the sequence, the sequence of parameters the electronic device faces appears to be more random and more closely simulates real-world conditions.

By utilizing a pseudo-random loop system and method, a far larger and more thorough sequence of protocol transitions and DUT states may be tested than could ever be practical with script testing. The random generation of parameter values alleviates the need for identifying every possible permutation and, by extension, generating complex multiple loop scripts which must run each permutation in a linear fashion. By retaining the sequence of protocol transitions, a failure may then be analyzed according the sequence of transitions it underwent prior to the failure. Thus, while the parameters were tested in random fashion, such randomness, for any one test, is prescribed and repeatable, either under control of controller 13 or by phone tester 12 because the values of the seed and parameters are maintained in memory. This further enables the designer to more easily duplicate the failure in a more real-world simulation.

Use of a pseudo-random loop system and method enables the designer to more easily test a complex electronic device's response to the interaction of multiple parameters. Under such an algorithm, the designer is not limited to testing only the parameters on a device or only the parameters associated with the base station. With such an algorithm, the designer is able to test the interaction between various parameters, regardless of which device the parameters are associated with, as well as analyze how the device reacts to the randomly-generated transitions between the parameters.

It should be recognized that many different embodiments of the system and method described therein may be used to achieve the same results. For example, pseudo-random loop algorithm 20 may be placed on a chip which is inserted into a system control device or mobile phone tester. Additionally, system control 13 and tester 12 may be combined in such a manner that the need for two separate devices is negated. A single device may then be used to maintain the results of the testing, manipulate the parameters of the BSE, and initiate contact with and manipulate the parameters of the DUT. Additionally, the concepts discussed herein are not limited to the testing of mobile phones, but may be useful in many different areas, including, for example, cordless telephones, paging devices, vehicle navigation systems, wireless networks, as well as other complex electronic systems outside the communication industry, such as elevators, automobile, traffic light controllers, computers, chip sets, etc.

What is claimed is:

1. A system for testing various parameters of mobile telephones, said system comprises:
   a controller for controlling the transmission of test sequences to a telephone under test (DUT) said test sequences causing said DUT to exercise certain ones of said parameters in a controlled pattern of operation, said controller comprising:
   a random looping algorithm for controlling both the order of and the magnitude of each parameter; and
   a storage device for storing the results of each test sequence.

2. The system of claim 1 further comprising:
   means, including said storage device, for selectively retransmitting previously transmitted test sequences.

3. The system of claim 1, wherein said random looping algorithm comprises a pseudo-random pattern controlled by a selected seed value.

4. The system of claim 1, further comprising means for presenting stored ones of said results to a user.

5. The system of claim 1, wherein said controller is coupled to said DUT over a wired connection.

6. The system of claim 1, wherein said controller is coupled to said DUT over a wireless connection.

7. The system of claim 1, wherein said DUT is a mobile phone.

* * * * *